E. J. MURPHY & J. E. BROBST.
MOTOR CONTROL SYSTEM.
APPLICATION FILED JUNE 20, 1912.
1,077,737.
Patented Nov. 4, 1913.
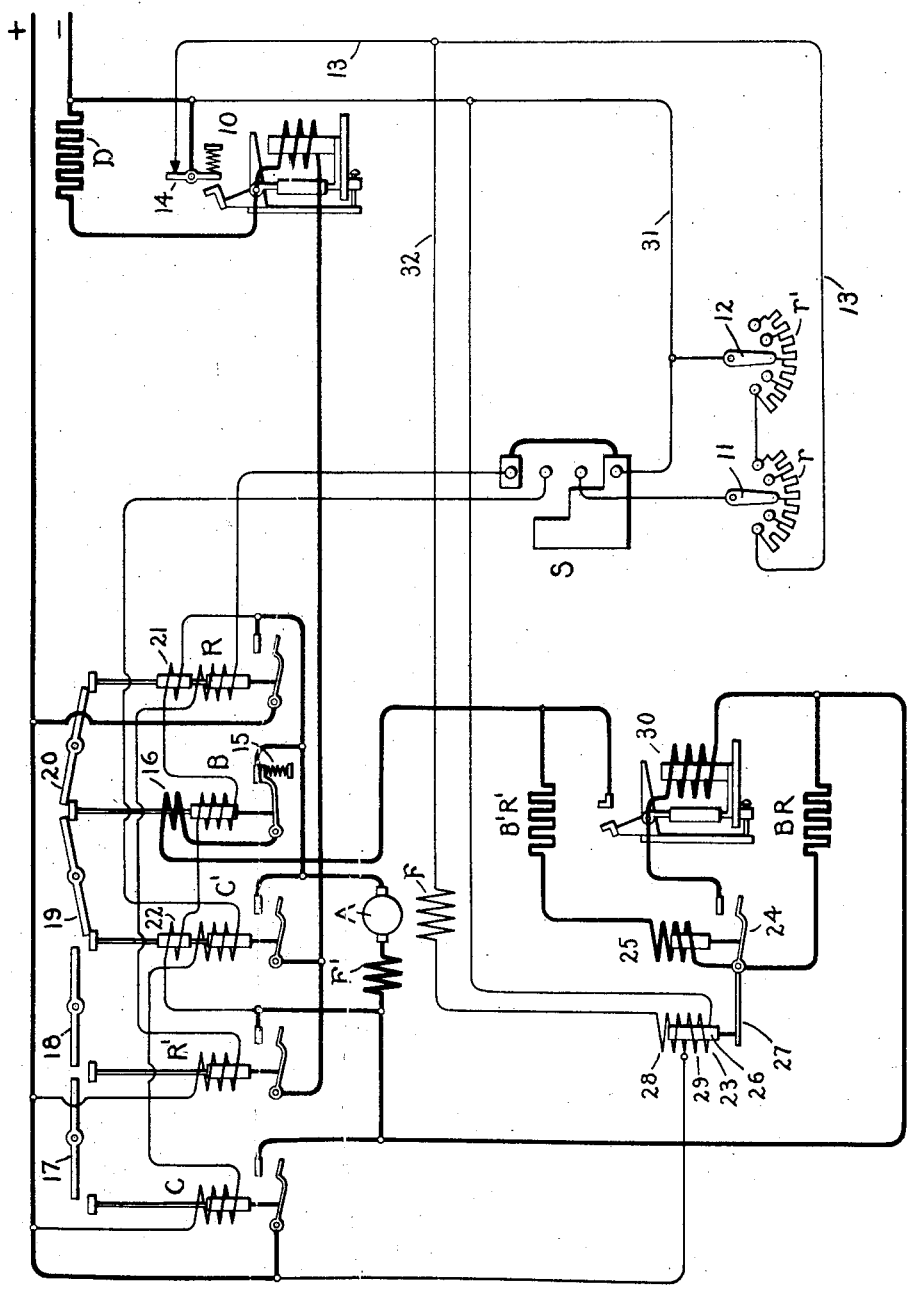
WITNESSES:
J. Earl Ryan
J. Ellis Ellen
INVENTORS:
EDWIN J MURPHY,
JOHN E BROBST,
BY
THEIR ATTORNEY.

UNITED STATES PATENT OFFICE.

EDWIN J. MURPHY AND JOHN E. BROBST, OF SCHENECTADY, NEW YORK, ASSIGNORS TO GENERAL ELECTRIC COMPANY, A CORPORATION OF NEW YORK.

MOTOR-CONTROL SYSTEM.

1,077,737.  Specification of Letters Patent. Patented Nov. 4, 1913.

Application filed June 20, 1912. Serial No. 704,746.

*To all whom it may concern:*

Be it known that we, EDWIN J. MURPHY and JOHN E. BROBST, citizens of the United States, residing at Schenectady, in the county of Schenectady, State of New York, have invented certain new and useful Improvements in Motor-Control Systems, of which the following is a specification.

This invention relates to the control of electric motors and has for its object the provision of means whereby an electric motor may be started, stopped and generally controlled in a reliable and efficient manner.

Our invention relates more specifically to the control of motors by what is known as dynamic braking so as to bring them to rest quickly and safely.

In the control of electric motors it is frequently desirable to bring the motor to rest quickly at a time when the field of the motor is relatively weak. This is frequently true of motors which must be quickly reversed, as, for instance, in the case of electrically driven planers and the like, although this condition is quite as apt to arise in connection with a non-reversible motor. It has been found that if the motor is stopped or retarded by dynamic braking, in this condition of weakened field, sparking at the commutator will result if the braking current is permitted to become too high. While it is customary to cut out the field resistance at the time the dynamic brake is applied, the field does not recover its full strength immediately owing to the inductive effect of the field circuit. It has been found that if the dynamic braking current is permitted to increase only as the field strength goes up sparking at the commutator can be avoided.

In an application of John E. Brobst, Serial No. 692,957, filed April 24, 1912, and assigned to the same assignee as this invention, there is described and claimed means whereby the dynamic braking current is controlled and graduated to the strength of the field. In the particular disclosure therein a relay is provided which operates when the predetermined field strength is reached and the necessary changes in connection with increase of dynamic braking current are accomplished.

In carrying out our invention we provide improved means for bringing about this result. This improvement consists broadly in providing an electromagnetic switch or relay which when closed changes the dynamic braking conditions. This switch is energized when the dynamic braking circuit is closed but is prevented from closing until the field current has reached a predetermined value. This holding out device preferably comprises two opposing or differential windings, one of which is connected across the supply circuit so as to have a substantially constant pull, while the other is connected in series with the motor field and the field resistance. The arrangement is such that the two windings will have equal and opposite effects when the field current reaches a predetermined value and therefore permit the electromagnetic switch to close, whereas when the current is below a predetermined value the winding connected across the supply circuit will predominate and hold the switch open. When, therefore, the field current has reached the predetermined value at which the dynamic braking current can be safely increased, the electromagnetic switch will operate to bring about an increase of current in the armature circuit up to the limit of commutation in the motor. There are two well known methods of dynamic braking, one of which involves the return of energy to the line, known as the "pumping back" onto the line, while the other involves cutting off the motor armature from the line and short circuiting it through a resistance. In this particular instance we have illustrated our invention in connection with the latter method of braking but our invention is in no sense limited to this particular type or method of braking.

In the accompanying drawing we have illustrated our invention in connection with a reversible motor control system for electric planer drives or the like, but it should be understood that our invention is equally applicable to other systems of control.

Referring to the drawing which shows diagrammatically one embodiment of our invention, A represents the armature and F the shunt field of an electric motor for driving a planer or the like. The direction of rotation is controlled by four electromagnetic switches or contactors, two for each direction of rotation. Two of these switches are designated as C and C', respectively, since they connect the motor for driving the planer in the forward or cutting direction, while the other two switches are designated R and R′, for driving the planer in the opposite or "return" direction. These four switches are controlled by a master switch S. In the drawing the parts are shown in the positions assumed when the main line is deënergized. When the switch S is in the position shown in the drawing and the line is energized, the windings of contactors R and R′ are energized across the line, while with the switch in the opposite position the windings of the contacts C and C′ are similarly connected across the line. A starting resistance D is provided for the motor, this resistance being controlled by an electromagnetic contactor 10. This particular contactor we have shown as being of the type which will not close when the current is high but will close when the current decreases to a predetermined value. Such a relay is described and claimed in the pending application of Edwin J. Murphy, Serial No. 608,652, filed February 15th, 1911. With this form of contactor the result is that when the circuit is first closed through resistance D, the switch 10 will not close until the current drops to a predetermined value by the speeding up of the motor armature. When, therefore, the motor starts and reaches a predetermined speed the contactor 10 will close to cut out the starting resistance D. For varying the speed of the motor we have provided two rheostats, one of which comprises a resistance $r$, which is regulated by a lever 11, while the other comprises a resistance $r'$, regulated by the lever 12. When the motor is started, and in fact whenever the switch 10 is open, both the resistances $r$ and $r'$ are short circuited through the wire 13 and the switch 14, which is spring closed. When, however, the switch 10 closes, the circuit through the wire 13 is opened at switch 14. When, therefore, the switch 10 is closed and the master switch is in the position shown in the drawing, that is, in the "return" position, all of the resistance $r$ and a portion of the resistance $r'$ the amount of which will depend upon the position of the lever 12, will be connected in the field circuit of the motor. When the master switch is moved to the opposite position only a portion of the resistance $r$ depending upon the position of lever 11 will be in series with the motor field.

In order to bring the motor armature to rest quickly we have provided a braking resistance through which the motor armature is short circuited. This braking resistance is divided into two sections BR and B′R′. The object of these two sections of resistance is to graduate the dynamic braking current in accordance with the field strength, that is, to gradually increase the braking current as the field strength builds up. For making the dynamic braking connections we provide the contactor B. This contactor is normally held closed by a spring 15. The winding of this contactor is connected across the armature of the motor so that while the motor is operated the winding tends to hold it closed. The contactor is likewise provided with a series winding 16 which is not energized until the contactor is closed, but which holds the contactor closed until the armature has ceased to rotate. The five contactors R, R′, C, C′ and B being arranged as shown in the drawing, we provide four mechanical interlocks 17, 18, 19 and 20, coöperating with the contactors so as to compel operation in a predetermined manner. The particular construction of these interlocks forms no part of our invention but for purposes of illustration we have shown bars pivoted at their middle points, the ends of each bar being engaged by upwardly projecting stems of two adjacent contactors in the closed position. For instance, when the contactor C closes the interlocking bar 17 will be turned so as to prevent the contactor R′ from closing. Likewise, when the contactor R′ is closed the interlocking bars 17 and 18 prevent the contactors C and C′ from closing. While the contactor B is closed by a spring this spring need not necessarily be so as to apply any great tension upon the contactor since electromagnetic means are provided for holding the contactor tightly closed. One object of having the contactor spring-closed is to insure that the dynamic brake is always applied when the controller is in the off position. The spring is of such a strength that it will move the contactor to closed position but it will also allow the contactor to be opened by either of the interlocking bars 19 and 20. In other words, when either the contactor R or C′ closes the contactor B is forced open by one of the interlocking bars 20 or 19, respectively, but neither of these contactors R or C′ will close when energized until the magnetic force holding the brake contactor closed is reduced substantially to zero. Both of the contactors R and C′ are provided with windings 21 and 22, respectively, connected across the armature in series with the winding of contactor B for holding these contactors in open position until the motor armature has come substantially to rest. These windings are merely an additional precaution, since the contactors are also held open by the mechanical interlocks.

One of the important features of our invention is the provision of an electromagnetic device 23 for controlling the brake resistance.

The brake resistance BR is short circuited by the electromagnetic switch or contactor 24 actuated by a winding 25 which is connected in series with the armature and the brake resistance when the brake contactor is closed. This contactor 24 will therefore close immediately upon the closing of the brake contactor and short circuit a section BR of the brake resistance unless restrained. In order to prevent the closing of this contactor until the field current has reached a predetermined value following the short circuiting of the field resistance, we provide an electromagnetic device 23 for holding the contactor 24 open. This device consists of energizing windings and a core 26 secured to a projection 27 on the contactor 24 so that when the core is held up the contactor will be held open. The core has two energizing windings 28 and 29 which are differential or oppose each other so that when equally and oppositely energized they will neutralize each other and permit the contactor 24 to close. One of these windings 28 is connected in series with the field F while the other winding 29 is connected directly across the supply circuit. The latter winding will therefore exert a substantially constant pull while the pull of the former winding will vary with the field current. These windings are so proportioned and arranged that when the field current approaches a maximum, that is, when the field is nearly full strength, the energizing force of winding 28 will be equal and opposite to that of the winding 29 and the contactor 24 will close, but when the field is weak the contactor will not close since under this condition the winding 29 overpowers the winding 28. When, therefore, the field has become sufficiently strong the contactor 24 closes and cuts out the section BR of the brake resistance so as to increase the braking current. We also provide another contactor 30 for cutting out the other section of brake resistance B'R'. This contactor we have also shown as of the same type as contactor 10, i. e., one which will not close when the current is high but will close when the current falls to a predetermined value. The winding of the contactor is connected in circuit by the closing of contactor 24. When the braking current decreases to a sufficiently low value due to the slowing down of the armature, the contactor 30 will close and short circuit all of the brake resistance, thereby bringing the motor armature to rest. We have shown the contactor 30 as of the particular type described merely for purposes of illustration, but any other well known means for causing the delay in the cutting out of the last section of resistance may be employed without departing from the spirit of our invention.

The mode of operation of our system as thus constructed and arranged is as follows: Assuming that the switch S has been moved to the position shown in the drawing, as, for instance, by the movement of the planer bed, the contactors R' and R will be energized in series through the upper and lower contacts of the master controller and back to the line through the wire 31. This will close the motor circuit from the positive side of the line through the contactor R, armature A, series communicating field F', contactor R' through winding of contactor 10, resistance D and back to the negative side of the line. The closing of the contact R operates interlocking bar 20 so as to open the brake contactor against the tension of the spring 15. The closing of the contactor R' operates the interlocking bars 17 and 18 to prevent the closure of the contactors C and C'. The motor will now start with the starting resistance D in series. The contactor 10 will not close upon the rush of current incident to the closing of the motor circuit but will close after the current is reduced by the motor speeding up. When the motor does come up to the predetermined speed the contactor 10 will close and short circuit the starting resistance D. The closing of the contactor 10 opens the switch 14 which opens the short circuit on the resistances r and r' connected in the shunt field so as to bring the motor up to the speed for which the lever 12 is set. The field circuit for the motor will now be from the positive side of the line through the winding 28, field F, thence through conductor 32, resistance r, resistance r', controlling arm 12 and conductor 31 to the negative side of the line. The motor will now be running at full speed on the return stroke.

When the reversing switch S is operated by the bed of the planer reaching the limit of its movement in the "return" direction, the contactors R and R' are first deënergized. This permits the brake contactor to close in response to the tension of the spring 15 since the interlocking bar 20 is released. The winding of this contactor which is connected across the armature coöperates with the spring and holds the contacts together and when the contacts are fully closed the winding 16 operates to force the contacts together still harder. The contactor C which has been energized by the throwing of the switch in the opposite direction may also close, since the interlocking bar 17 is released. The contactor C', however, cannot close since it is held open by the holding out winding 22. After the brake contactor is closed contactor C' is likewise held open by the interlocking bar 19. The opening of the contactors R and R' disconnects the motor from the line and the closing of contactor B connects the motor armature in a closed circuit through the series commutating field winding F', resistance BR, winding 25 of contactor 24, resistance B'R', winding 16, and the contacts of contactor B. The opening of the contactors R and R' deënergizes the series contacter 10 which opens to insert the resistance D for the return stroke and also allows the switch 14 to close and strengthen the field by short circuiting the field resistances r and r'. The field circuit will now be from the positive side of the line through the winding 28, field F, conductor 13, switch 14, to the negative side of the line. The field, however, does not build up immediately, and the contactor 24 is therefore held open by reason of the fact that the winding 29 of the holding out device overpowers the winding 28. The braking current is therefore relatively low, since the two sections of braking resistance are in circuit and no sparking at the commutator will result. When, however, the field builds up sufficiently the winding 28 will be sufficiently energized to counteract the effect of the winding 29 and the core 26 will be released, thereby permitting the contactor 24 to be closed by its winding 25. This occurs when the field has reached a predetermined strength which is near the maximum, so that the braking current may be considerably increased without sparking at the commutator. The cutting out of the resistance BR increases the braking current up to the limit of commutation thereby avoiding sparking and slows the motor down. As the motor slows down the braking current decreases and finally closes the contactor 30 to short circuit resistance B'R' which completes the short circuit on the armature and brings the motor to rest or substantially so. It is obvious, of course, that the motor could be brought to rest without cutting out the section B'R' and in that case the contactor 30 would be unnecessary. When the motor is practically stopped the holding out winding 22 will become substantially deënergized as will also the winding of the brake contactor which is in series with the winding 22. The winding 16 which holds the brake contactor closed during braking also releases so that the contactor C' will now open the contact B against the tension of the spring 15. The two contactors C and C' being now closed, the motor will start in the reverse direction at full field strength and with the resistance D in series with the motor armature. As the motor speeds up the contactor 10 will again close to short-circuit the resistance D and open the switch 14 to insert the field resistance. The field circuit will now be through only a portion of the resistance r determined by the position of the lever 11. At the end of the stroke the switch S will be again operated to open the contactors C and C' and close the brake contact. In a similar manner the braking will take place through the two sections of braking resistance and when the field builds up one section after another will be cut out until the motor armature has stopped.

It will be seen that we have provided a simple and effective arrangement whereby the operation of the electromagnetic switch controlling the braking current is made dependent upon the field strength. While we have shown our invention as embodied in concrete form and as operating in a specific manner in accordance with the patent statutes, it should be understood that we do not desire to limit our invention thereto, since various modifications thereof will suggest themselves to those skilled in the art without departing from the spirit of our invention, the scope of which is set forth in the annexed claims.

What we claim as new and desire to secure by Letters Patent of the United States is:—

1. The combination with an electric motor, of a resistance in the field circuit thereof during normal operation, means for short circuiting said resistance and simultaneously causing said motor to act as a generator and generate a dynamic braking current to retard the motor armature, and an electromagnetic device for controlling the dynamic braking current having differential actuating windings one of which is connected across the supply circuit and the other in series with the motor field so as to counteract each other when the field reaches substantially full strength.

2. The combination with an electric motor, of a resistance in the field circuit thereof during normal operation, means for short circuiting said resistance and simultaneously causing said motor to act as a generator to generate a dynamic braking current to retard the motor armature, an electromagnetic switch for increasing the braking current when closed arranged to be energized upon the closing of the braking circuit, and means for preventing the closing of said switch until the field current reaches the predetermined value.

3. The combination with an electric motor, of a resistance in the field circuit thereof during normal operation, a brake resistance, means whereby the motor armature is short circuited through the brake resistance to generate a dynamic braking current and the field resistance simultaneously short circuited, and an electromagnetic device for controlling the dynamic braking current having differential actuating windings one of which is connected across the supply circuit and the other in series with the motor field so as to counteract each other when the field reaches substantially full strength.

4. The combination with an electric motor, of a resistance in the field circuit thereof during normal operation, a brake resistance, means whereby the motor armature is short circuited through the brake resistance to generate a dynamic braking current and the field resistance simultaneously short circuited, an electromagnetic switch for controlling the braking current arranged to be energized upon the closing of the braking circuit, and means for preventing the closing of said switch until the field current reaches a predetermined value.

5. The combination with an electric motor, of a resistance in the field circuit thereof during normal operation, a brake resistance, means whereby the motor armature is short circuited through the brake resistance to generate a dynamic braking current and the field resistance simultaneously short circuited, an electromagnetic switch for controlling the braking current arranged to be energized upon the closing of the braking circuit, and an electromagnetic device for preventing the switch from closing until the field current reaches a predetermined value, said device having differential actuating windings which counteract each other when the field reaches substantially full strength, one of said windings being connected across the supply circuit and the other in series with the motor field.

6. The combination with an electric motor, of a resistance in the field circuit thereof during normal operation, a brake resistance, means whereby the motor armature is short circuited through the brake resistance to generate a dynamic braking current and the field resistance simultaneously short circuited, an electromagnetic switch arranged to short circuit a section of said brake resistance when closed, and an electromagnetic device for preventing the closure of said switch having differential actuating windings one of which is connected across the supply circuit and the other in series with the motor field so as to counteract each other when the field reaches substantially full strength.

In witness whereof, we have hereunto set our hands this 18th day of June 1912.

EDWIN J. MURPHY.
JOHN E. BROBST.

Witnesses:
  HELEN ORFORD,
  R. G. POVEY.

Copies of this patent may be obtained for five cents each, by addressing the "Commissioner of Patents, Washington, D. C."